(12) United States Patent
Kim et al.

(10) Patent No.: US 12,145,566 B2
(45) Date of Patent: Nov. 19, 2024

(54) STRUCTURE OF CONTROL DEVICE IN BRAKE SYSTEM

(71) Applicant: HL MANDO CORPORATION, Gyeonggi-do (KR)

(72) Inventors: Minseong Kim, Gyeonggi-do (KR); Sang Woo Kim, Gyeonggi-do (KR); Seungcho Han, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 394 days.

(21) Appl. No.: 17/617,275

(22) PCT Filed: Jun. 8, 2020

(86) PCT No.: PCT/KR2020/007421
§ 371 (c)(1),
(2) Date: Dec. 7, 2021

(87) PCT Pub. No.: WO2020/246868
PCT Pub. Date: Dec. 10, 2020

(65) Prior Publication Data
US 2022/0242379 A1    Aug. 4, 2022

(30) Foreign Application Priority Data

Jun. 7, 2019  (KR) ........................ 10-2019-0067246
Jun. 7, 2019  (KR) ........................ 10-2019-0067247
Jun. 7, 2019  (KR) ........................ 10-2019-0067248

(51) Int. Cl.
*B60T 8/92*    (2006.01)
*B60T 8/36*    (2006.01)
(Continued)

(52) U.S. Cl.
CPC ................ *B60T 8/92* (2013.01); *B60T 8/368* (2013.01); *B60T 8/885* (2013.01); *B60T 13/745* (2013.01);
(Continued)

(58) Field of Classification Search
CPC ........ B60T 8/885; B60T 8/368; B60T 13/745; B60T 2220/04; B60T 2270/402;
(Continued)

(56) References Cited

U.S. PATENT DOCUMENTS

2009/0079259 A1    3/2009  Iwasaki et al.
2009/0189439 A1    7/2009  Abe et al.
(Continued)

FOREIGN PATENT DOCUMENTS

CN    108639038    10/2018
CN    108944883    12/2018
(Continued)

OTHER PUBLICATIONS

Japanese Patent No. JP 2009196627 to Abe et al published on Sep. 3, 2009.*

(Continued)

*Primary Examiner* — Pamela Rodriguez
(74) *Attorney, Agent, or Firm* — Womble Bond Dickinson (US) LLP (57) ABSTRACT

The present invention relates to the structure of an electronic control unit (ECU) in a brake system, in which an ECU board that constitutes redundancy is additionally arranged in a symmetrical or asymmetric structure and a plurality of motor position sensors for redundancy are arranged, to prepare for malfunction of the ECU, to thus have an effect of operating the brake system normally by another motor position sensor even if one of the motor position sensors malfunctions.

6 Claims, 7 Drawing Sheets

(51) Int. Cl.
  B60T 8/88   (2006.01)
  B60T 13/74  (2006.01)
  B60T 17/22  (2006.01)
  H02K 3/50   (2006.01)
  H02K 7/102  (2006.01)
  H02K 11/21  (2016.01)
  H02K 11/33  (2016.01)
  H02P 25/22  (2006.01)
  H02P 29/028 (2016.01)

(52) U.S. Cl.
  CPC .............. B60T 17/22 (2013.01); H02K 3/50 (2013.01); H02K 7/102 (2013.01); H02K 11/21 (2016.01); H02K 11/33 (2016.01); H02P 25/22 (2013.01); H02P 29/028 (2013.01); *B60T 13/74* (2013.01); *B60T 2220/04* (2013.01); *B60T 2270/10* (2013.01); *B60T 2270/304* (2013.01); *B60T 2270/402* (2013.01); *B60T 2270/403* (2013.01); *B60T 2270/404* (2013.01); *B60T 2270/413* (2013.01); *B60T 2270/82* (2013.01); *B60T 2270/88* (2013.01); *H02K 2203/09* (2013.01); *H02K 2211/03* (2013.01); *H02K 2213/06* (2013.01)

(58) Field of Classification Search
  CPC ......... B60T 2270/413; B60T 2270/403; B60T 8/92; B60T 17/22; B60T 2270/10; B60T 2270/304; B60T 2270/404; B60T 2270/82; B60T 2270/88; B60T 13/74; H02P 27/06; H02P 29/028; H02K 11/21; H02K 11/33; H02K 3/50; H02K 7/102; H02K 2203/09; H02K 2211/03; H02K 2213/06
  See application file for complete search history.

(56) References Cited

U.S. PATENT DOCUMENTS

| | | | |
|---|---|---|---|
| 2009/0189441 A1 | 7/2009 | Degoul et al. | |
| 2011/0320099 A1 | 12/2011 | Kim | |
| 2014/0142829 A1 | 5/2014 | Strengert et al. | |
| 2016/0009263 A1 | 1/2016 | Feigel et al. | |
| 2016/0272173 A1 | 9/2016 | Shin et al. | |
| 2018/0099652 A1* | 4/2018 | Jung | B60T 13/662 |
| 2019/0217837 A1* | 7/2019 | Feigel | B60T 13/686 |
| 2019/0351884 A1 | 11/2019 | Tajima et al. | |
| 2021/0163026 A1 | 6/2021 | Ochida et al. | |
| 2022/0073038 A1 | 3/2022 | Suzuki et al. | |
| 2022/0266805 A1 | 8/2022 | Park et al. | |
| 2024/0045426 A1 | 2/2024 | Ditty et al. | |

FOREIGN PATENT DOCUMENTS

| | | |
|---|---|---|
| CN | 108964561 | 12/2018 |
| CN | 109843672 | 6/2019 |
| JP | 2009-196626 | 9/2009 |
| KR | 10-2016-0049807 | 5/2016 |
| KR | 10-2018-0126288 | 11/2018 |
| KR | 10-2019-0032597 | 3/2019 |
| KR | 10-2019-0038662 | 4/2019 |

OTHER PUBLICATIONS

International Search Report for PCT/KR2020/007421 mailed on Sep. 11, 2020 (now published as WO 2020/246868) with English translation provided by WIPO.
Written Opinion of the International Searching Authority for PCT/KR2020/007421 mailed on Sep. 11, 2020 (now published as WO 2020/246868) with English translation provided by WIPO.
Office Action dated Sep. 20, 2023 for Chinese Patent Application No. 202080042089.1 and its English machine translation from Google Translate.
Office Action dated Sep. 22, 2023 for Chinese Patent Application No. 202080042125.4 and its English machine translation from Google Translate.
Office Action dated Sep. 22, 2023 for Chinese Patent Application No. 202080042136.2 and its English machine translation from Google Translate.
Extended European Search Report dated Jul. 26, 2023 for European Patent Application No. 20819402.7.
Office Action dated Jun. 21, 2024 for U.S. Appl. No. 17/617,268.

* cited by examiner

STRUCTURE OF CONTROL DEVICE IN BRAKE SYSTEM

CROSS-REFERENCE TO RELATED APPLICATIONS

The present application is the national stage of International Patent Application No. PCT/KR2020/007421 filed on Jun. 8, 2020, which claims the priority to Korean Patent Application No. 10-2019-0067246 filed in the Korean Intellectual Office on Jun. 7, 2019, Korean Patent Application No. 10-2019-0067247 filed in the Korean Intellectual Office on Jun. 7, 2019, and Korean Patent Application No. 10-2019-0067248 filed on Jun. 7, 2019 in the Korean Intellectual Office, the entire contents of which are incorporated herein by reference.

TECHNICAL FIELD

The present invention relates to a vehicle, and more particularly, to a structure of a brake system for a vehicle.

BACKGROUND ART

A brake system is absolutely necessary for a vehicle. This is because a vehicle that cannot be stopped cannot travel. Therefore, for the safety of passengers, the stability of a brake system cannot be emphasized enough.

Recently, as an interest in autonomous vehicles and electric vehicles has increased, brake systems have also been required to have stronger braking power and stability. To this end, an electronic master booster has been used instead of the conventional hydraulic system, and an integrated dynamic brake (IDB) system, in which an anti-lock brake system (ABS) and an electronic stability control (ESC) system are integrated, has been developed. The use of such an IDB system has made it possible to reduce the size and weight of a brake system and has brought results of providing various functions and significantly improving stability.

However, since such an IDB system includes many electronic devices, the IDB system always has a risk of a failure. When, during driving of a vehicle, a brake system fails and is in an inoperable state, it can lead to a serious accident, and thus, it is necessary to prepare for the inoperable state of the brake system.

The inventors of the present invention have made efforts to solve the problems of brake systems according to the related art. The inventors of the present invention have completed the present invention after much effort to complete a system capable of normally operating a brake system in response to an unexpected situation even when a part of the brake system fails.

DISCLOSURE

Technical Problem

The present invention is directed to providing a structure of a brake system in which an entire system can operate normally even when a part of the system fails.

Meanwhile, other objects of the present invention which are not explicitly stated will be further considered within the scope easily deduced from the following detailed description and the effects thereof.

Technical Solution

According to an exemplary embodiment of the present invention, an electronic control unit (ECU) assembly structure of a brake system includes a housing having spaces separated by a partition, a first control unit and a second control unit which are independently disposed in the spaces separated by the partition, a first microcontroller unit (MCU) and a second MCU respectively positioned in the first control unit and the second control unit, a motor controlled by the first MCU or the second MCU to generate a driving force in a hydraulic piston, and a motor position sensor (MPS) configured to detect a rotational position of the motor, wherein the second control unit constitutes redundancy of the first control unit to perform the same function.

The motor may have a central axis positioned on an extension line of the partition at which the first control unit and the second control unit face each other, and a first MPS and a second MPS may be respectively disposed on the first control unit and the second control unit corresponding thereto within a radius of a head of the motor.

The motor may have the central axis positioned on the extension line of the partition at which the first control unit and the second control unit face each other; and the head of the motor may be positioned between the first MPS and the second MPS.

The motor may have the central axis positioned on the extension line of the partition at which the first control unit and the second control unit face each other, the first MPS and the second MPS may be positioned on a third printed circuit board (PCB), and the third PCB may be connected to the first control unit and the second control unit through a wire.

The motor may have the central axis of which an extension line is positioned on the first control unit, and the first MPS and the second MPS may be positioned on the extension line of the central axis of the motor.

The first MPS may be positioned below the first control unit, the second MPS may be positioned above the first control unit, and the second MPS and the second control unit may be connected through a bus bar.

The first MPS and the second MPS may be positioned on a third PCB, and the third PCB and the first control unit may be connected through a first bus bar so that the first MPS is connected to the first control unit, and the third PCB and the second control unit may be connected through a second bus bar so that the second MPS is connected to the second control unit.

The motor may include a first motor head in a direction of the first control unit and a second motor head in a direction opposite to the first control unit, the first MPS may be positioned on the first control unit between the first control unit and the first motor head, and the second MPS may be positioned on a fourth PCB positioned on an extension line of an axis of the motor in a direction of the second motor head so that the fourth PCB and the second control unit are connected through a wire to connect the second MPS to the second control unit.

The motor may have the central axis of which an extension line is positioned on the first control unit, the first MPS may be positioned on the extension line of the central axis of the motor, and the second MPS may be positioned to be coplanar with a head of the motor perpendicular to the central axis of the motor.

Advantageous Effects

According to the present invention, by providing redundant printed circuit boards (PCBs) having the same structure, even when one PCB fails, the redundant PCB performs the same function, and thus, it is possible to cope with an emergency situation, thereby increasing the stability of a brake system.

Meanwhile, even if the effects are not explicitly mentioned here, the effects described in the following specification, which are expected by the technical characteristics of the present invention, and the provisional effects thereof are handled as described in the specification of the present invention.

The accompanying drawings are included to provide a further understanding of the technical idea of the present invention, and thus the scope of the present invention is not limited thereto.

MODES OF THE INVENTION

Hereinafter, a configuration of the present invention guided by various exemplary embodiments of the present invention and effects resulting from the configuration will be described with reference to the accompanying drawings. In describing the present invention, the detailed descriptions of the related known-functions that are obvious to a person skilled in the art and would unnecessarily obscure the subject of the present invention are omitted.

Terms such as "first," "second," and the like may be used to describe various components, but the components should not be limited by the above terms. The terms may be used only for the purpose of distinguishing one component from another component. For example, without departing from the scope of the present invention, a "first component" may be called a "second component," and similarly, a "second component" may also be called a "first component." In addition, a singular expression may include a plural expression, unless otherwise specified. The terms used in the exemplary embodiments of the present invention may be interpreted with the commonly known meaning to those of ordinary skill in the relevant technical field, unless otherwise specified.

Hereinafter, a configuration of the present invention guided by various exemplary embodiments of the present invention and effects resulting from the configuration will be described with reference to the accompanying drawings.

Figure 1:
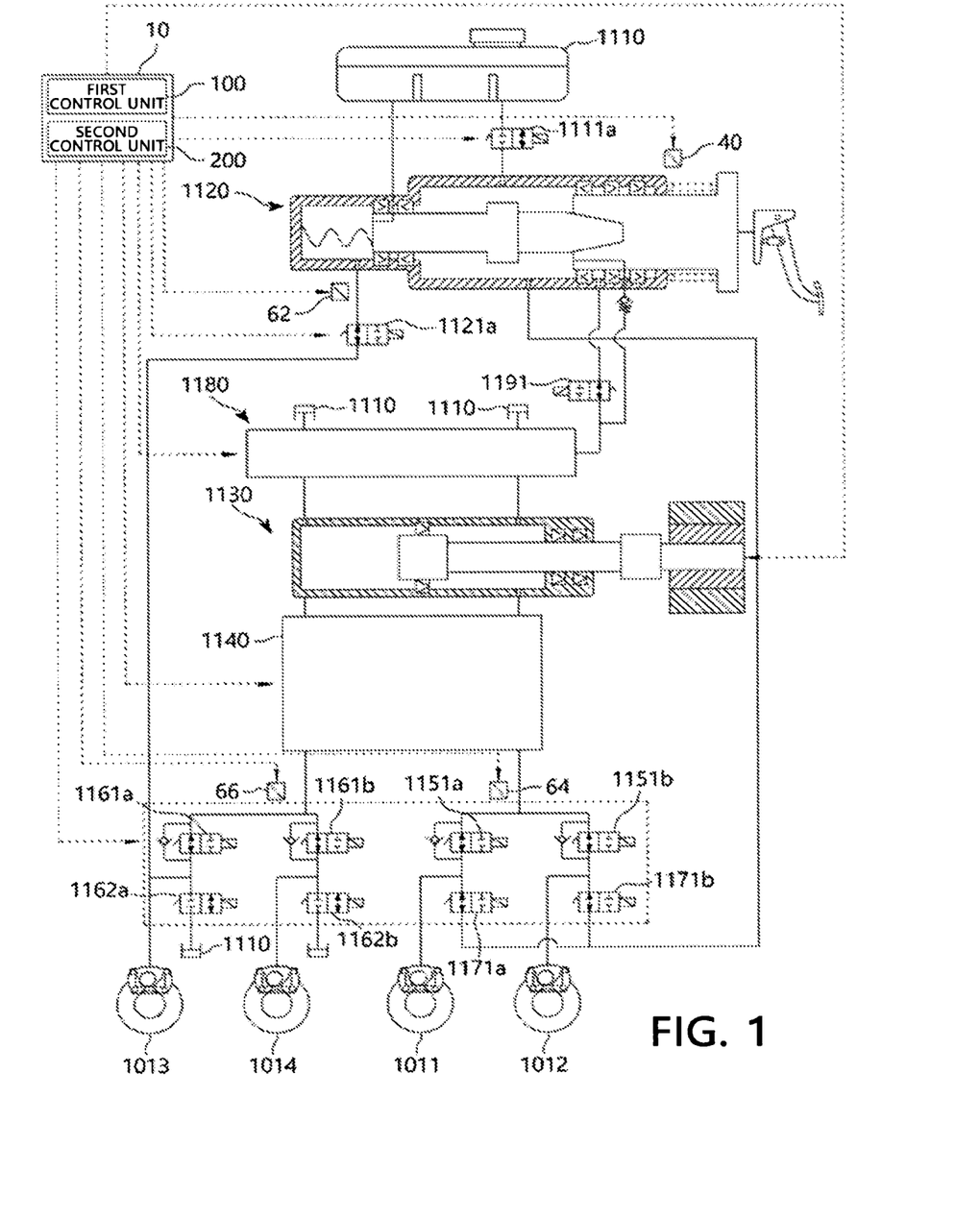
FIG. 1 is a schematic structural diagram of a brake system according to an exemplary embodiment of the present invention.

FIG. 1 is a schematic structural diagram of the entirety of a brake system according to an exemplary embodiment of the present invention.

The brake system includes a reservoir 1110, a master cylinder 1120, a hydraulic pressure supply device 1130, a hydraulic control unit 1140, a dump control unit 1180, valves and sensors for controlling channels, and an electronic control unit (ECU) for controlling the components.

The reservoir 1110 stores a pressure medium that flows along a flow path to generate pressure. The pressure medium flows to a required place according to an adjustment of a valve. A simulator valve 1111a formed in a flow path of the reservoir 1110 controls a flow of a pressure medium between the reservoir 1110 and the master cylinder 1120. During normal operation, the simulator valve 1111a is opened so that a user links the reservoir 1110 and the master cylinder 1120. In an abnormal operation mode, the simulator valve 1111a is closed so that a pressure medium of the master cylinder 1120 is transferred to valves for wheel cylinder control through a backup flow path.

When a driver presses on a brake pedal, the master cylinder 1120 pressurizes and discharges a pressure medium such as brake oil accommodated therein. Thus, the master cylinder 1120 provides a reaction force according to a braking depression force to the driver. A cut valve 1121a controls a flow of a backup flow path between the master cylinder 1120 and the valves for controlling the wheel cylinders.

The hydraulic pressure supply device 1130 generates hydraulic pressure according to a position of a pedal and transmits the hydraulic pressure to the wheel cylinders of wheels 1011, 1012, 1013, and 1014, whereby a vehicle is braked. The hydraulic pressure supply device 1130 includes a motor to generate hydraulic pressure.

The hydraulic control unit 1140 controls the hydraulic pressure provided from the hydraulic pressure supply device 1130.

The dump control unit 1180 controls a flow of a pressure medium between the reservoir 1110 and the hydraulic pressure supply device 1130.

Each valve opens or closes a flow path formed between the reservoir 1110 and the master cylinder 1120 or the reservoir 1110 and the hydraulic pressure supply device 1130 to control a flow of a pressure medium. The valves are provided as check valves formed to allow only one direction flow without the need for control or solenoid valves of which opening and closing are controlled under control of an ECU 10.

Inlet valves 1161a, 1161b, 1151a, and 1151b control a flow of a pressure medium supplied from the hydraulic pressure supply device 1130 to the wheel cylinders.

Outlet valves 1162a and 1162b control a flow of a pressurize medium discharged from the wheel cylinders to the reservoir 1110.

Furthermore, other outlet valves 1171a and 1171b control a flow of a pressure medium between the wheel cylinders and the master cylinder 1120.

A diagnostic valve 1191 is used when a diagnostic mode of examining a failure of other valves or a leak in a flow path is performed.

The ECU 10 receives signals from sensors 40, 62, 64, and 66 and controls the respective valves or the motor included in the hydraulic pressure supply device 1130 to control the operation of the brake system.

Figure 2:
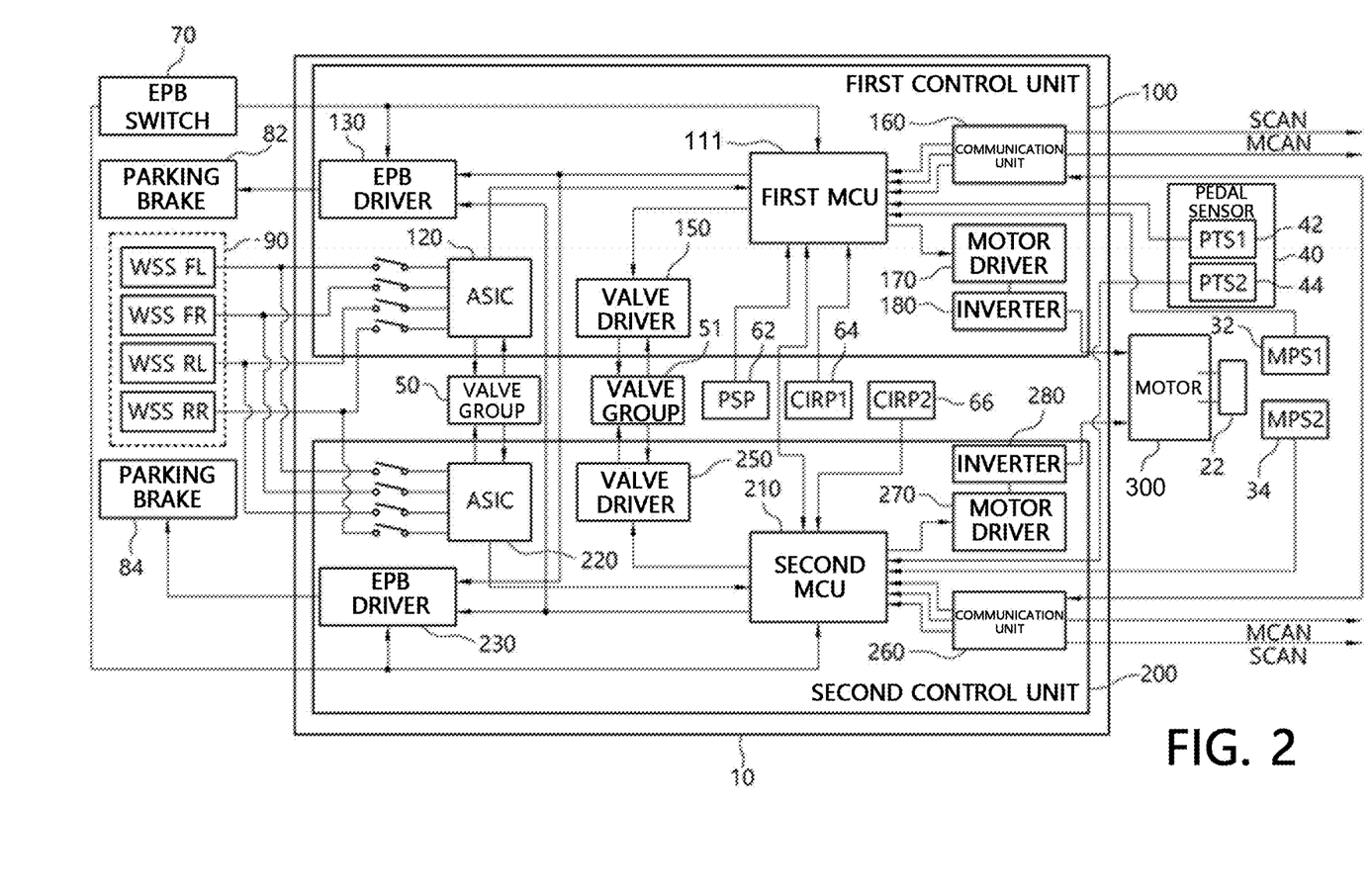
FIG. 2 is a schematic structural diagram of an electronic control unit (ECU) of a brake system according to an exemplary embodiment of the present invention.

FIG. 2 is a diagram illustrating an overall structure of an ECU 10.

The ECU 10 includes a first control unit 100 including a first microcontroller unit (MCU) 111 and a second control unit 200 including a second MCU 210.

The first MCU 111 has a structure that receives inputs from motor position sensors 32 and 34, a pedal sensor 40, pressure sensors 62, 64, and 66, and the like to control a motor 300, a valve 50, parking brakes 82 and 84, and the like.

Figure 3:
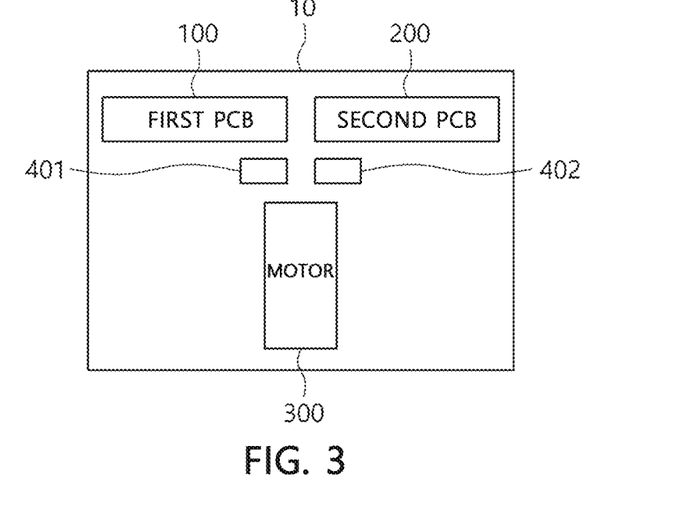
FIG. 3 is a diagram illustrating a structure of a motor position sensor in an ECU in more detail.

FIG. 3 is a diagram illustrating an arrangement structure of a motor position sensor in an ECU 10 in more detail.

The ECU 10 includes a first control unit provided as a first printed circuit board (PCB) 100, a second control unit provided as a second PCB 200, a motor 300, and motor position sensors (MPSs) 401 and 402.

The motor 300 is included in a hydraulic pressure supply device 1300 to generate and supply hydraulic pressure required by a hydraulic unit under control of an MCU. To this end, a position of the motor 300 should be precisely controlled, and an MCU included in the PCB may detect a position of the motor through the MPSs 401 and 402 and precisely control the motor 300.

Figure 4:
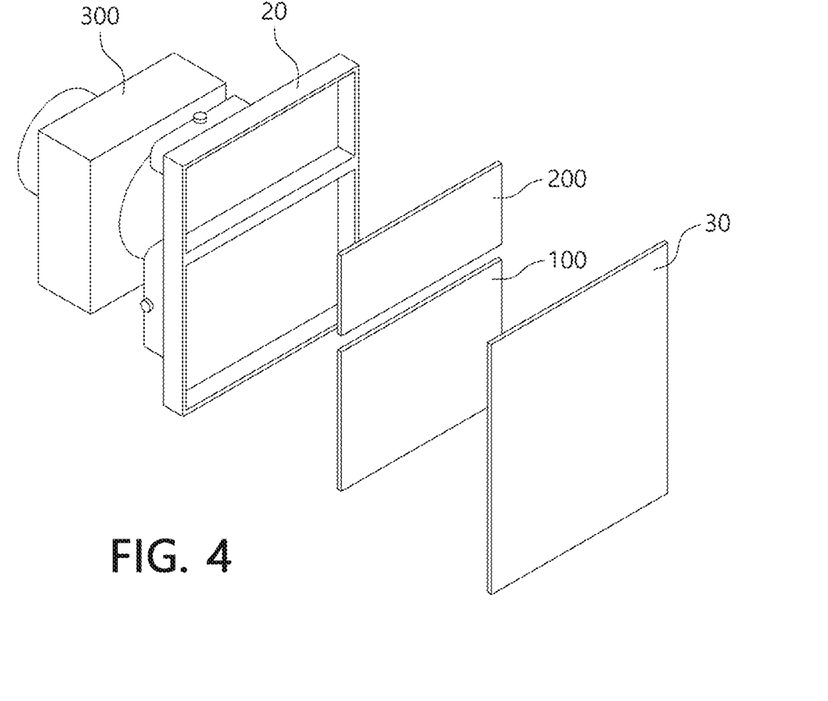
FIG. 4 is an exploded perspective diagram of a brake system according to an exemplary embodiment of the present invention.

FIG. 4 is an example of an exploded perspective diagram of an ECU 10.

A housing 20 is positioned between a motor 300 and a hydraulic block, and PCBs 100 and 200. Coils and bus bars are connected to the housing to connect respective sensors and the PCBs or connect a first control unit 100 and a second control unit 200.

A cover 30 covers the first control unit 100 and the second control unit 200 positioned in the housing 20 and also serves as a heat sink.

Figure 5:
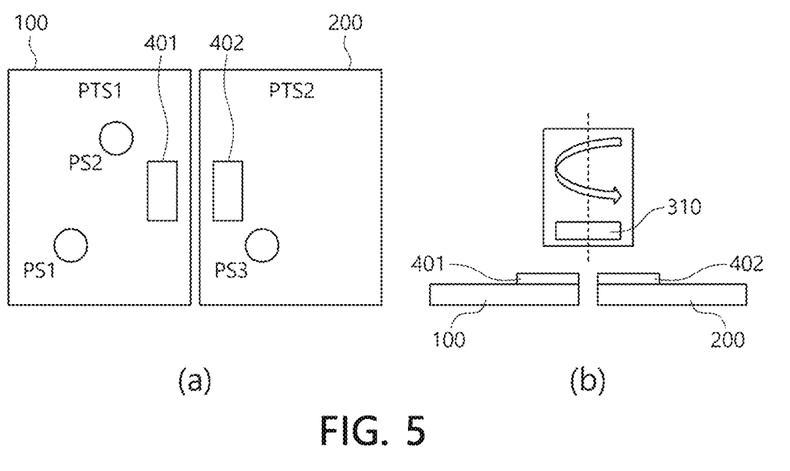
FIG. 5 shows diagrams illustrating an arrangement example of motor position sensors and a principle thereof.

FIG. 5 shows diagrams illustrating an arrangement example of MPSs and a principle thereof.

In FIG. 5A, a first MPS 401 and a second MPS 402 are respectively positioned on a first control unit 100 and a second control unit 200. Since the MPSs 401 and 402 should be within a range of a head magnet of a motor, the MPSs 401 and 402 are symmetrically positioned at portions at which the first control unit 100 and the second control unit 200 face each other.

When a head 310 of the motor rotates in FIG. 5B, the MPSs 401 and 402 may detect the head 310 to detect a rotational position of the motor.

Figure 6:
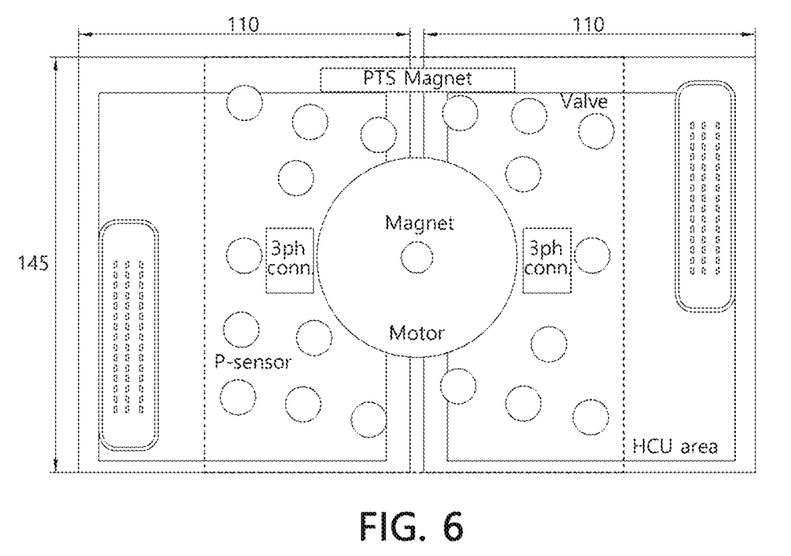
FIGS. 6 to 8 illustrate a state in which sensors are disposed according to an exemplary embodiment of the present invention.

FIG. 6 illustrates an arrangement example of MPSs and illustrates a state in which a first control unit and a second control unit are disposed symmetrically with respect to a motor in the same structure. The MPSs may also be disposed symmetrically.

Figure 9:
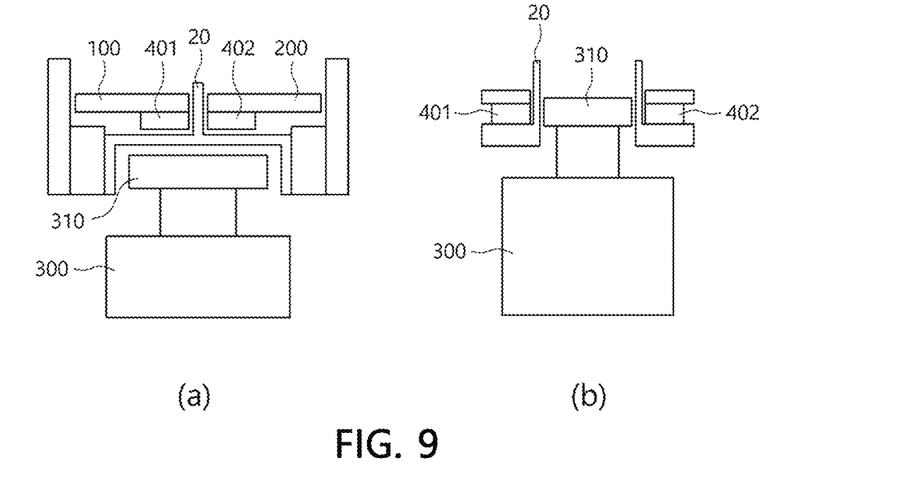
FIGS. 9 to 12 illustrate arrangement structures of motor position sensors according to various exemplary embodiments of the present invention.
Figure 10:
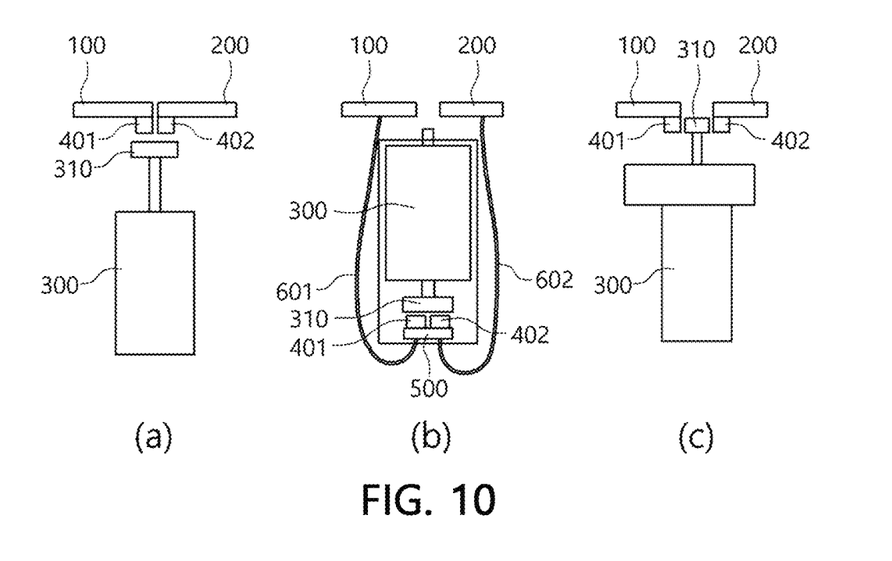

FIGS. 9 and 10 illustrate examples in which MPSs are disposed symmetrically as described above.

Figure 7:
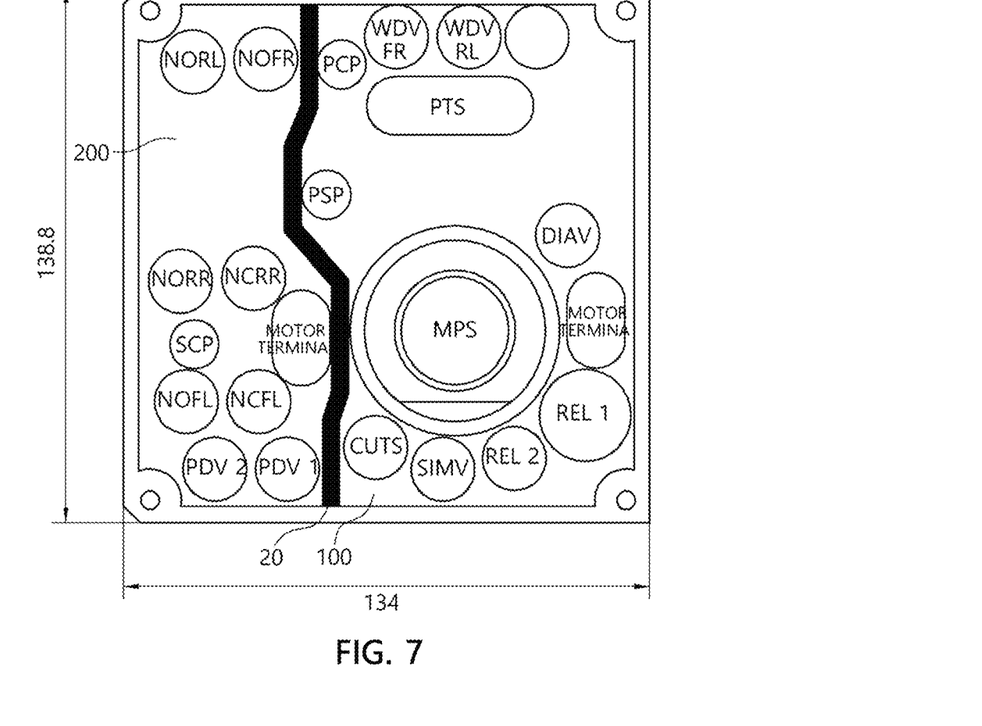

FIG. 7 illustrates another arrangement example of MPSs. The MPSs are positioned on a central axis of a motor on a first control unit 100, and thus, the first control unit 100 and a second control unit 200 have an asymmetrical structure separated by a housing 20.

Figure 11:
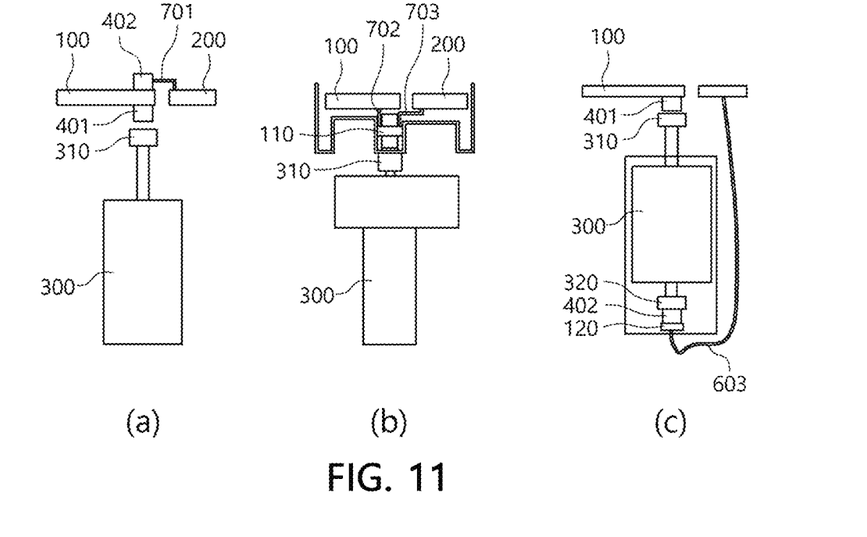
Figure 12:
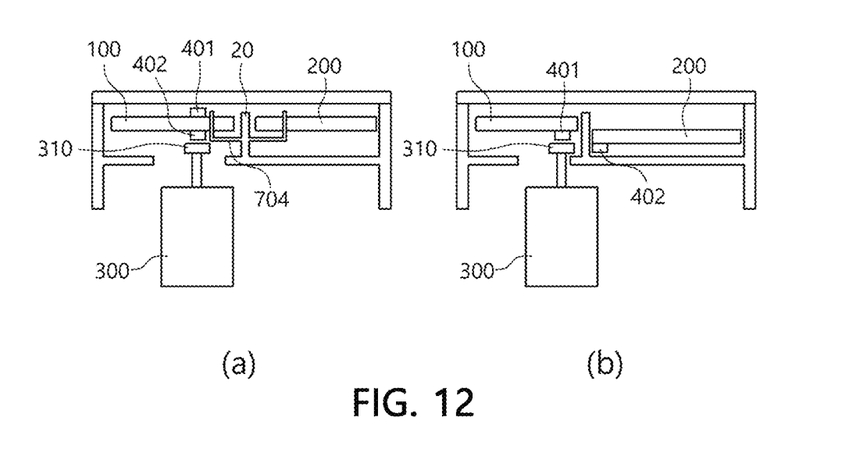

FIGS. 11 and 12 illustrate examples in which MPSs have an asymmetrical structure.

Figure 8:
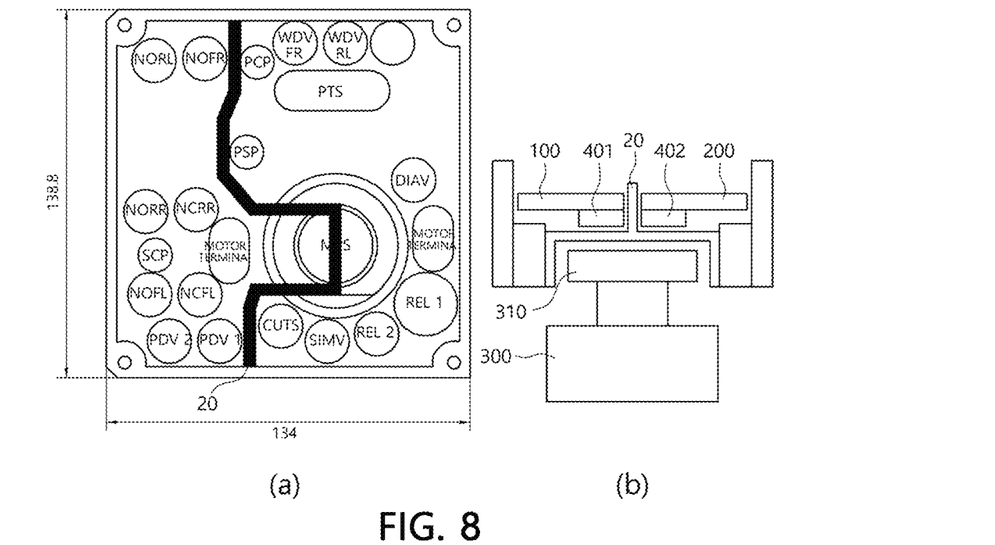

FIG. 8 illustrates an example in which MPSs have a symmetrical structure even though motor PCBs do not have a symmetrical structure.

In the example FIG. 8A, two PCBs have an asymmetric structure, but at a portion at which a motor and MPSs are positioned, two PCBs have a symmetrical structure in which a housing 20 passes through a central axis as shown in FIG. 6. Accordingly, as shown in FIG. 8B, a central axis of a motor 300 may pass between a first control unit 100 and a second control unit 200, and a first MPS 401 and a second MPS 402 may also be disposed in a symmetrical structure with respect to the central axis of the motor.

FIGS. 9 to 12 illustrate arrangement structures of MPSs according to various exemplary embodiments of the present invention.

In FIG. 9A, a first control unit 100 and a second control unit 200 are positioned in spaces separated by a housing 20, and a motor 300 is also positioned in a space separated from the first control unit 100 and the second control unit 200. A first MPS 401 and a second MPS 402 are positioned symmetrically with respect to a central axis of the motor 300 with a housing 20 interposed therebetween. In order to increase sensing performance of the MPSs, a motor head 310 may have a radius capable of covering all positions at which the MPSs 401 and 402 are placed. A case in which the MPSs 401 and 402 are placed within the radius of the motor head 310 is referred to as an on-axis.

FIG. 9B illustrates an off-axis arrangement in which MPSs 401 and 402 are not placed within a radius of a motor head 310. A first MPS 401 is positioned below a first control unit 100, and a second MPS 402 is positioned below a second control unit 200. The motor head 310, the first MPS 401, and the second MPS 402 may be positioned side by side on a plane perpendicular to an axis of a motor 300.

FIG. 10 illustrates examples in which MPSs 401 and 402 are disposed at symmetrical positions.

In FIG. 10A, a first MPS 401 is positioned below a first control unit 100, and a second MPS 402 is positioned below a second control unit 200. It can be seen that the first MPS 401 and the second MPS 402 are at an on-axis position positioned within a radius of a motor head 310. An opening for the motor head 310 may be formed in a housing such that the motor head 310 is positioned close to the MPSs 401 and 402.

FIG. 10B illustrates an example of a case in which a motor head is positioned in a direction opposite to a PCB of an ECU. A motor head 310 is positioned in a direction opposite to a first control unit 100 and a second control unit 200, and a first MPS 401 and a second MPS 402 are positioned on a third PCB 500. The first and second MPSs 401 and 402 are disposed symmetrically with respect to a central axis of a motor and are disposed within a radius of the motor head 310. The third PCB 500 and PCBs of the first and second control units 100 and 200 are structures that are connected through wires 601 and 602.

FIG. 10C illustrates a structure in which motor sensors are positioned on a side surface of a motor head rather than on a central axis of a motor. A first MPS 401 is positioned on a first control unit 100, a second MPS 402 is positioned below a second control unit 200, and a motor head 310 is positioned between the first MPS 401 and the second MPS 402. The first MPS 401, the second MPS 402, and the motor head 310 are positioned side by side on the same plane perpendicular to the central axis of a motor 300.

FIG. 11 illustrates examples in which both MPSs 401 and 402 are disposed on an extension line of a motor axis. To this end, an asymmetrical structure is formed in which a central axis of a motor 300 is positioned on a first control unit 100 rather than between the first control unit 100 and a second control unit 200.

In FIG. 11A, a first MPS 401 is positioned on one surface of the first control unit 100, a second MPS 402 is positioned on the other surface of the first control unit 100, and both of the two sensors are positioned within a radius of a motor head 310 on an extension line of a central axis of the motor 300. FIG. 11A illustrates a structure in which the first MPS 401 is connected directly to the first control unit 100, and the second MPS 402 is connected to the second control unit 200 through a bus bar 701 between the first control unit 100 and the second control unit 200.

FIG. 11B illustrates a case in which a separate PCB on which MPSs are mounted is used. A third PCB 110 is positioned on an extension line of a central axis of the motor 300, and a first MPS 401 and a second MPS 402 are respectively positioned on one surface and the other surface of the third PCB 110. The third PCB 110 is connected to the first control unit 100 through a second bus bar 702 and is connected to the second control unit 200 through a third bus bar 703 so that the first MPS 401 and the second MPS 402 are respectively connected to the first control unit 100 and the second control unit 200.

FIG. 11C illustrates a structure in which MPSs are positioned in different directions using two motor heads. A first MPS 401 is connected directly to the first control unit 100. A second MPS 402 is positioned on a fourth PCB 120 positioned on an extension line of a second motor head 320 positioned in a direction opposite to the first control unit 100, and the fourth PCB 120 and the second control unit 200 are connected through a wire 603 so that the second MPS 402 is connected to the second control unit 200.

FIG. 12 illustrates other examples in which a first control unit and a second control unit are asymmetrical with respect to a central axis of a motor.

In FIG. 12A, a first MPS 401 and a second MPS 402 are positioned on an extension line of a central axis of a motor 300 on one surface and the other surface of a first control unit 100, and the first MPS 401 or the second MPS 402 is connected to a second control unit 200 through a bus bar 704. The bus bar 704 has a structure that is connected by passing through a partition of a housing 20 which physically separates spaces in which the first control unit 100 and the second control unit 200 are placed.

FIG. 12B illustrates an example in which a first MPS is placed in an on-axis and a second MPS is placed in an off-axis.

The first MPS 401 is placed on a central axis of a motor 300 on one surface of a first control unit 100 ands thus is placed at an on-axis position. On the other hand, a second MPS 402 has a structure that is positioned on a side surface of a motor head 310 on a planar surface perpendicular to the central axis of the motor 300 and thus is connected directly to a second control unit 200. In order for both two sensors to be at an on-axis position, the motor head 310 should have a large size, but the large size increases costs. Therefore, when one sensor is positioned in an on-axis and the other sensor is positioned in an off-axis, there is an effect of reducing the size of the motor head 310.

The protection scope of the present invention is not limited to the disclosure and expressions of the exemplary embodiment clearly described above. In addition, it is added that the protection scope of the present invention is not limited by modifications and substitutions obvious to the technical field to which the present invention pertains.

The invention claimed is:

1. An electronic control unit (ECU) assembly structure of a brake system, comprising:
a housing having spaces separated by a partition;
a first control unit and a second control unit which are independently disposed in the spaces separated by the partition;
a first microcontroller unit (MCU) and a second MCU respectively positioned in the first control unit and the second control unit;
a motor controlled by the first MCU or the second MCU to generate a driving force in a hydraulic piston; and
a motor position sensor (MPS) configured to detect a rotational position of the motor,
wherein the second control unit constitutes redundancy of the first control unit to perform the same function,
wherein the motor has a central axis positioned on an extension line of the partition at which the first control unit and the second control unit face each other;
a first MPS and a second MPS are respectively disposed on the first control unit and the second control unit corresponding thereto within a radius of a head of the motor,
the first MPS and the second MPS are positioned on a third printed circuit board (PCB); and
the third PCB is connected to the first control unit and the second control unit through a wire.

2. An electronic control unit (ECU) assembly structure of a brake system, comprising:
a housing having spaces separated by a partition;
a first control unit and a second control unit which are independently disposed in the spaces separated by the partition;
a first microcontroller unit (MCU) and a second MCU respectively positioned in the first control unit and the second control unit;
a motor controlled by the first MCU or the second MCU to generate a driving force in a hydraulic piston; and
a motor position sensor (MPS) configured to detect a rotational position of the motor,
wherein:
the second control unit constitutes redundancy of the first control unit to perform the same function;
the motor has the central axis of which an extension line is positioned on the first control unit;
a first MPS and a second MPS are respectively disposed on the first control unit and the second control unit corresponding thereto within a radius of a head of the motor, and
the first MPS and the second MPS are positioned on the extension line of the central axis of the motor.

3. The ECU assembly structure of claim 2, wherein:
the first MPS is positioned below the first control unit;
the second MPS is positioned above the first control unit; and
the second MPS and the second control unit are connected through a bus bar.

4. The ECU assembly structure of claim 2, wherein:
the first MPS and the second MPS are positioned on a third printed circuit board (PCB), and the third PCB and the first control unit are connected through a first bus bar so that the first MPS is connected to the first control unit; and
the third PCB and the second control unit are connected through a second bus bar so that the second MPS is connected to the second control unit.

5. The ECU assembly structure of claim 2, wherein:
the motor includes a first motor head in a direction of the first control unit and a second motor head in a direction opposite to the first control unit;
the first MPS is positioned on the first control unit between the first control unit and the first motor head; and
the second MPS is positioned on a fourth printed circuit board (PCB) positioned on an extension line of an axis of the motor in a direction of the second motor head so that the fourth PCB and the second control unit are connected through a wire to connect the second MPS to the second control unit.

6. An electronic control unit (ECU) assembly structure of a brake system, comprising:
a housing having spaces separated by a partition;
a first control unit and a second control unit which are independently disposed in the spaces separated by the partition;
a first microcontroller unit (MCU) and a second MCU respectively positioned in the first control unit and the second control unit;
a motor controlled by the first MCU or the second MCU to generate a driving force in a hydraulic piston; and
a motor position sensor (MPS) configured to detect a rotational position of the motor,
wherein:
the second control unit constitutes redundancy of the first control unit to perform the same function;
the motor has the central axis of which an extension line is positioned on the first control unit;
a first MPS and a second MPS are respectively disposed on the first control unit and the second control unit corresponding thereto within a radius of a head of the motor,
the first MPS is positioned on the extension line of the central axis of the motor; and
the second MPS is positioned to be coplanar with the head of the motor perpendicular to the central axis of the motor.

* * * * *